United States Patent [19]

Zappia

[11] 4,003,464
[45] Jan. 18, 1977

[54] DOUBLE ARM PUSH BAR STACKER

[75] Inventor: Anthony T. Zappia, Indianapolis, Ind.

[73] Assignee: Ball Brothers Service Corporation, Muncie, Ind.

[22] Filed: Apr. 1, 1975

[21] Appl. No.: 564,103

[52] U.S. Cl. .............................. 198/430; 198/436
[51] Int. Cl.² ...................................... B65G 47/26
[58] Field of Search ............... 198/24, 31 AB, 221, 198/222; 214/1 BB, 83.3

[56] References Cited

UNITED STATES PATENTS

| | | | |
|---|---|---|---|
| 2,720,304 | 10/1955 | Weber | 198/31 AB |
| 3,068,987 | 12/1962 | Franklin | 198/24 X |
| 3,196,811 | 7/1965 | Lefever | 198/24 X |
| 3,200,967 | 8/1965 | Delzanno | 198/24 X |

*Primary Examiner*—Evon C. Blunk
*Assistant Examiner*—Douglas D. Watts
*Attorney, Agent, or Firm*—Jenkins, Hanley & Coffey

[57] ABSTRACT

A lehr loader or stacker for use with a conveyor for moving ware serially past the moving apron of a lehr, the loader comprising a frame adjacent the conveyor, and a pair of pusher bars on the frame alongside the conveyor and opposite the lehr apron. The bars are movable alternately transversely across the conveyor to sweep ranks of ware transversely from the conveyor onto the lehr apron for movement thereon through the lehr. The bars are mounted upon the frame for movement through the same general path, each bar being provided by a pair of longitudinally extending bar sections providing a longitudinal space therebetween. The mounting system for each bar includes arms supporting, respectively, the bar sections, one of the arms for each said bar being movable through the space between the bar sections of the other said bar as the bars move through the path.

19 Claims, 6 Drawing Figures

DOUBLE ARM PUSH BAR STACKER

The present invention relates to lehr loaders or stackers, and more particularly to the provision of such a loader having a pair of pusher bars alternately movable through the same general path including a horizontal stroke transversely across the conveyor which moves ware serially past the moving apron of the lehr.

The invention has been devised primarily for driving a pair of pusher bars in a lehr loader in which the pusher bars must travel at a relatively low level to push ware from an incoming conveyor onto a belt or apron travelling transversely with respect to the incoming conveyor, must then be raised to a level above the top of the ware moving on the incoming conveyor and, at an upper level, must be retracted, and then must be lowered to its starting point; and therefore the invention has been illustrated and will be described in what is presently believed to be the optimum form for use in that environment. However, it will be understood that the invention must have uses in other environments.

The prior art discloses a multitude of different types of lehr loaders. My own U.S. Pat. No. 3,244,266 discloses a lehr loader having two pusher bars movable through the same general path.

While the prior art discloses lehr loaders or stackers with multiple push bars movable through the same general path, I believe that the prior art does not disclose the double arm concept for mounting two alternating push bars disclosed herein. Particularly, I believe the prior art does not disclose my concept of having the push bars each provided by a pair of longitudinally extending bar sections providing a longitudinal space therebetween with the mounting means for the bars including, for each bar, a pair of arm means supporting, respectively, the bar sections and with one of the arm means for each bar being movable through the space between the bar sections of the other said bar as the bars move through their paths of movement.

By utilizing two alternating push bars, cycling rates up to thirty-five per minute are obtained. The double arm and bar concept of the present invention permits adequate time to program a smooth, low impact motion in contacting and moving the ware into the lehr.

In the present invention, for the four bar sections, four race-track chain drive mechanisms provide the basic stacker motion with a high degree of accuracy and reliability. Each chain drive mechanism reciprocates a carriage on which each arm means is mounted and raises and lowers the arm means on the carriage. Cam means is provided for shifting the arm means and the bar sections held thereby laterally to track the ware as it moves on the cross conveyor to eliminate interference with the next ware in the following row.

It is an object of the present invention, therefore, to provide, in a lehr loader for use with a conveyor for moving ware serially past the moving apron of a lehr, the loader comprising frame means adapted to be adjacent the conveyor, and a pair of pusher bars alongside the conveyor and opposite the lehr apron, the bars being alternately movable transversely across the conveyor to sweep ranks of ware transversely from the conveyor onto the lehr apron for movement thereon through the lehr, in which the movement comprises means for mounting the bars upon the frame means for such movement and drive means for moving the bars. The mounting means provides for movement of the bars through the same general path, each bar being provided by a pair of longitudinally extending bar sections providing a longitudinal space therebetween. The mounting means includes, for each bar, a pair of arm means supporting, respectively, its bar sections, one of the arm means for each bar being movable through the space between the bar sections of the other bar as the bars alternately move through said path.

The preferred mounting means provides for a path including, sequentially, a forward stroke toward the lehr apron to engage and move the ware onto the apron, an upward stroke to provide clearance for the forward stroke of the other bar and for the ware on the incoming conveyor, a rearward stroke, and a downward stroke to the starting position for the forward stroke. The bars are synchronized or, more particularly, the drive system is synchronized such that one of the bars is starting its downward stroke when the other of the bars is starting its upward stroke.

In the preferred and illustrated embodiment, the said mounting means includes, for each said bar, a carriage or carriage means reciprocably movable in the direction of the forward stroke which engages and moves the ware onto the lehr apron, a first arm mounted on the carriage for pivotal movement at its proximal end about a horizontal axis parallel to the bars, a second arm mounted on the distal end of the first arm for pivotal movement about a horizontal axis parallel to the last said axis, the second arm extending vertically downwardly to provide a lower end or end portion to which said bar is attached. The said drive means preferably includes, for each bar, a pair of rotor means journal mounted for rotation about horizontally extending axes parallel to the bars and spaced apart in the direction of the said forward stroke, endless means or flexible means such as a chain trained about the rotor means, and means for providing a driving connection between the endless means and the carriage associated with the bar and between the endless means and the first arm pivoted on the carriage. The movement of the endless means about the rotor means reciprocates the carriage and raises and lowers the first arm.

Other objects and features of the present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
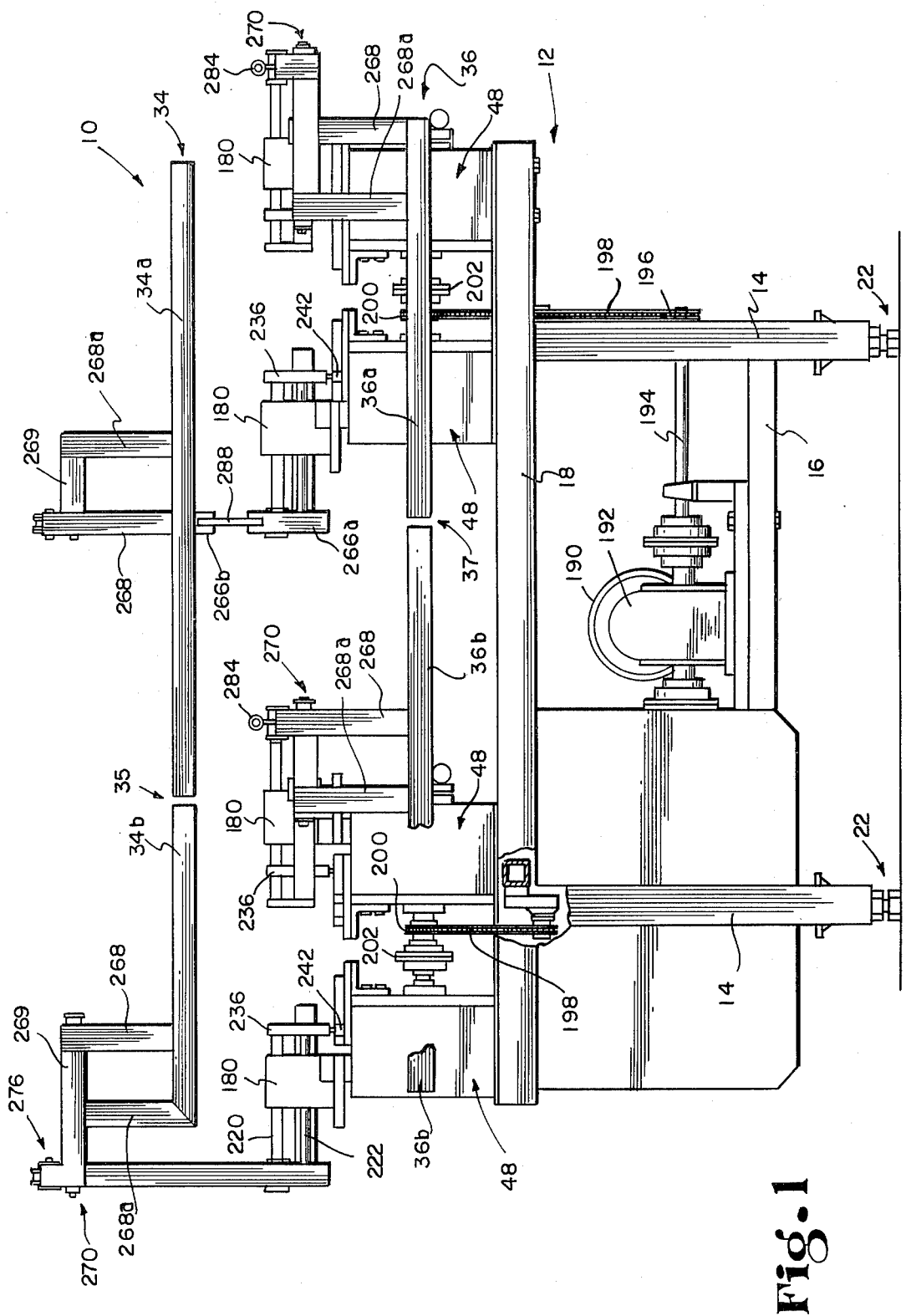
FIG. 1 is a front elevational view, partially cut away, showing the lehr loader of the present invention.

Referring now particularly to the drawings, the lehr loader 10 is shown comprising a support frame 12 including support legs 14 which may be connected together by lower cross braces 16 and upper cross braces 18 as illustrated to provide a structurally sound framework upon which the components of the lehr loader are mounted. Casters 20 may be provided, respectively, at the lower ends of the legs 14, and adjustable mounts as indicated at 22 may be provided for adjustably positioning the frame 12 adjacent, for instance, the conveyor 24 (FIG. 2) upon which ware items 26 are serially fed to a lehr apron 28 which is continuously moving in the direction of the arrow 30 perpendicular to the direction of movement of the conveyor 24. The two bars 34, 36 are mounted upon the lehr loader 10 to be transversely movable alternately across the conveyor 24 to sweep ranks of ware 26 onto the apron 28. For reasons to be discussed hereinafter, each pusher bar 34, 36 is provided by a bar section 34a, 34b, 36a, 36b which are longitudinally extending and which are spaced apart to provide a space 35, 37 therebetween. These spaces 35, 37 are small enough in longitudinal extent, i.e., direction of movement of conveyor 24, that a ware item 26 will not pass therethrough.

Figure 3:
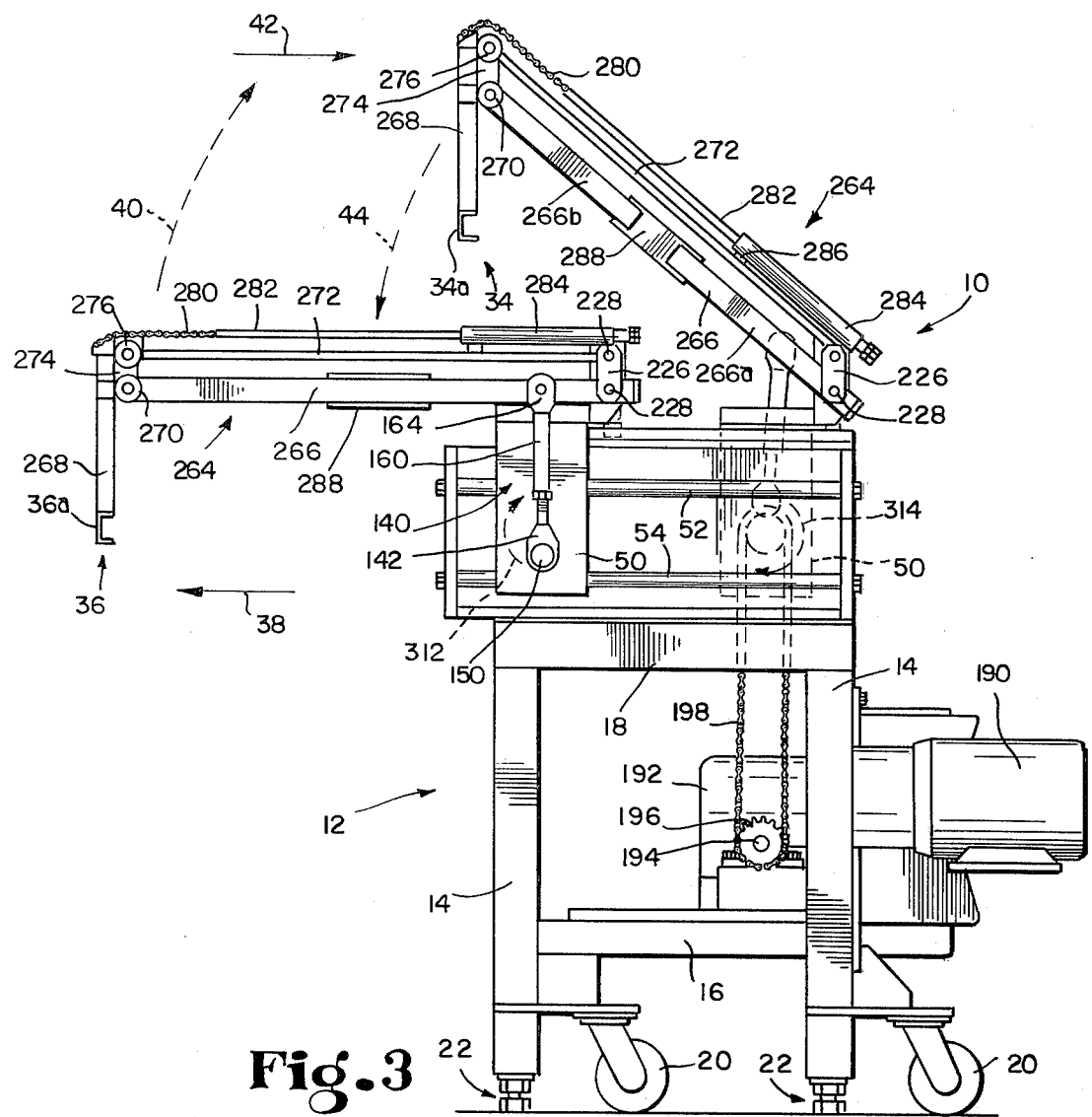
FIG. 3 is a side elevational view of the lehr loader taken from the right hand side of FIG. 1.

Turning to FIG. 3, arrows 38, 40, 42, 44 indicate the path through which each bar 34, 36 moves during operation of the lehr loader 10 including a forward stroke toward the lehr apron as indicated by the arrow 38, an upward stroke as indicated by the arrow 40, a rearward stroke as indicated by the arrow 42, and a downward stroke as indicated by the arrow 44 to the starting position for the forward stroke.

Figure 5:
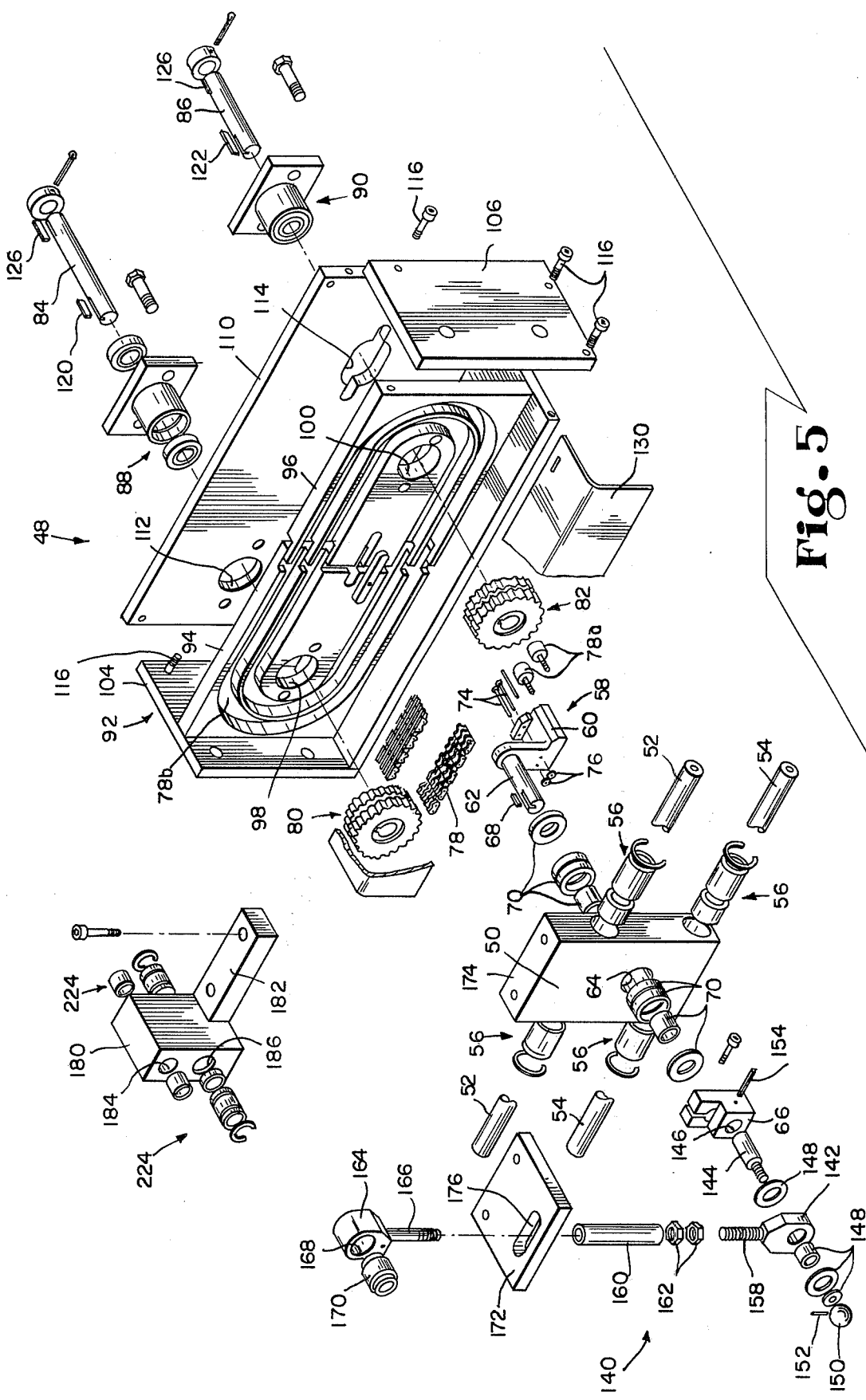
FIG. 5 is an exploded perspective view of the drive mechanism of the present invention.
Figure 6:
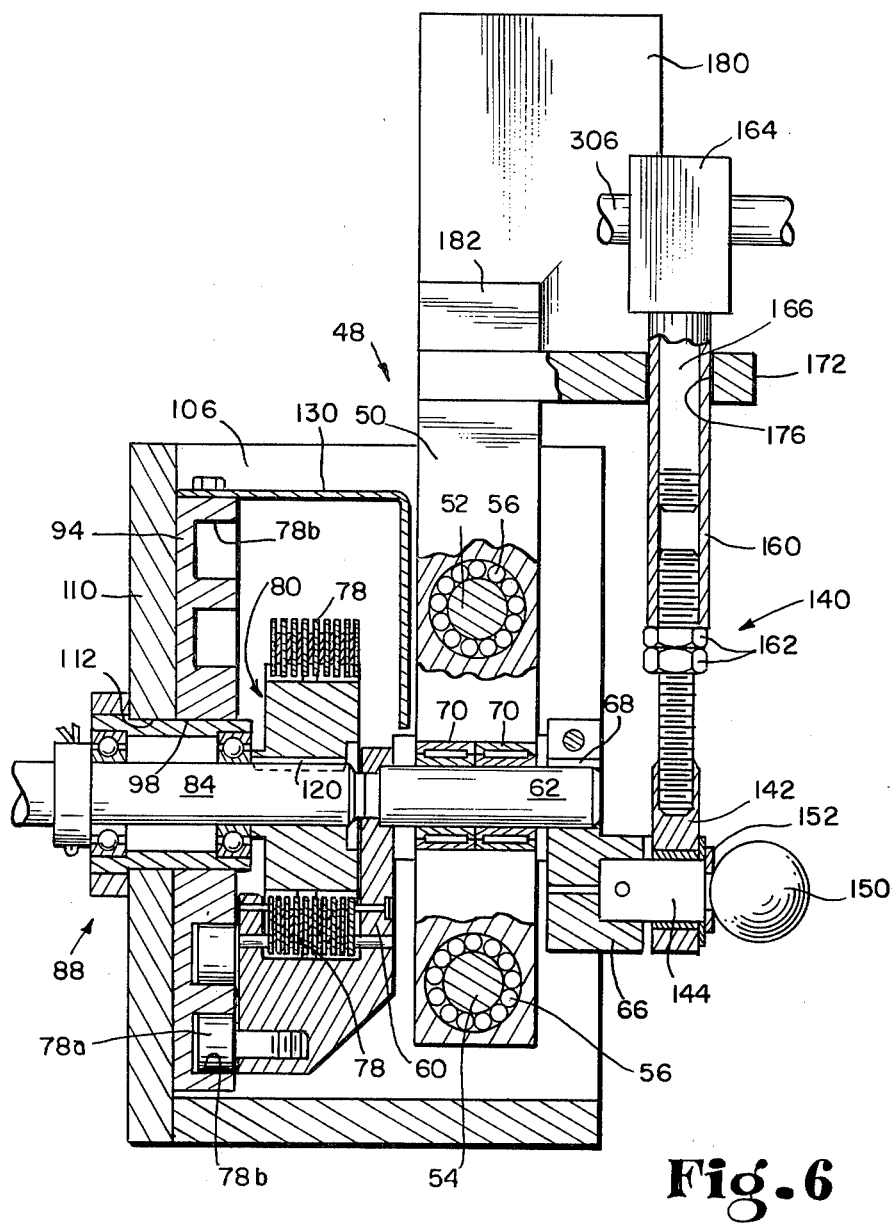
FIG. 6 is an enlarged fragmentary sectional view of the drive mechanism of FIG. 5.

The mounting means and the drive means of the present invention will now be discussed with particular reference to FIGS. 5 and 6 initially, the basic drive assembly for each bar section being indicated at 48. The mounting means for each bar section as well as the drive means for each bar section or for each bar are identical such that a detailed description of only one mounting means and one drive means will suffice. The mounting means includes, for each bar section, a carriage 50 supported for reciprocation in the direction of the forward stroke on guide rods 52, 54 with appropriate bearing means indicated at 56 movably mounting the carriage upon the rods. Crank means 58 including a block 60 from which a shaft 62 extends horizontally in the direction of the pusher bars 34, 36 is provided to extend through an opening 64 in the carriage 50 and to support, on its distal end, a block 66 providing an eccentric for the crank means. Suitable bearing means and washers 70 are provided for mounting the shaft 62 in the carriage 50. Fastening elements such as the screws 74 and nuts 76 are provided for fastening the crank block 60 to a chain 78 which is trained about a pair of sprockets 80, 82 journal mounted for rotation about parallel, horizontally extending axes spaced apart in the direction of the said forward stroke (arrow 38). A pair of bearings 78a are mounted upon the block 60 to ride in a trackway 78b about the perimeter of the path of the chain 78. The sprockets 80, 82 are mounted, respectively, on sprocket shafts 84, 86 journal mounted by means of bearing blocks 88, 90 upon the drive assembly 48 housing 92. That housing 92 includes adjustably movable wall sections 94, 96 having openings 98, 100, respectively, therein through which the shafts 84, 86 and their bearings extend. The two wall sections 94, 96, which define the track 78b, are adjustable for purposes of adjusting the tension on the chain 78. The drive assembly housing 92 also includes end plates 104, 106, a side plate 110 also with openings 112, 114 for the shafts 84, 86 and their bearing blocks 88, 90 with sundry fastening elements 116 for holding the parts of the housing together. The opening 114 is elongated in the direction of adjustment of the wall sections 94, 96.

The sprockets 80, 82 are drivingly connected to the shafts 84, 86 by keys 120, 122, respectively. The shafts 84, 86 have illustratively another key 126 on the opposite end for providing a driving connection between one of the shafts and another sprocket 200 (FIG. 1) about which a drive chain for the assembly 48 is trained. Either sprocket 80, 82 may be the input sprocket or driving sprocket for the assembly 48. A cover 130 is mounted upon the housing 92 to cover the sprockets and chain.

A rigid link means 140 is drivingly connected to the eccentric block 66, the illustrative link means including a connector 142 which is mounted upon a shaft 144 received in an opening 146 in the block 66. The opening 146 is eccentrically disposed relative to the opening in the block 66 into which the shaft 62 extends. Rotation of the shaft 62, therefore, swings the shaft 14 in an arc about the axis of the shaft 62. Washers and bearings 148 are conventionally used in the mounting of the connector 142 on the shaft 144, and a knob 150 is mounted on the threaded distal end of the shaft 144 with a pin 152 through the shaft to keep the connector 142 on the shaft. The connector 142 provides a threaded shaft 158 extending vertically upwardly threadedly to engage a sleeve 160. Locking and adjustment nuts 162 may be threaded on the shaft 158 as illustrated. The link means 140 includes an upper connector 164 providing a downwardly extending threaded shaft 166 which threadedly engages the sleeve 160. The connector 164 also provides an opening 168 therethrough which receives a bearing 170 for purposes to be discussed hereinafter. A plate 172 is mounted on the top surface 174 of the carriage 50, the plate providing an opening 176 elongated in the direction of the guide rods 52, 54 and through which the sleeve 160 extends. A block 180 is mounted on top of the plate 172 by means of an extension 182, the block 180 providing openings 184, 186 extending therethrough and parallel to the axes of the sprocket shafts 84, 86. The function of this block 180 will be discussed hereinafter.

The loader 10 comprises, in the illustrative embodiment, a motor 190 and gear box 192 (FIGS. 1 and 3) providing an output shaft 194 upon which output sprockets 196 (only one of which is shown) are mounted. The motor 190 is preferably a selectively variable speed motor such that the speed of the output shaft 194 and, consequently, the drive assemblies 48 can be selectively controlled. The input sprockets for the drive assemblies 48 are indicated at 200 in FIG. 1 and chains 198 are trained about mating sprockets 196, 200. Couplings 202 may be used between the input shafts of adjacent drive assemblies 48.

Figure 2:
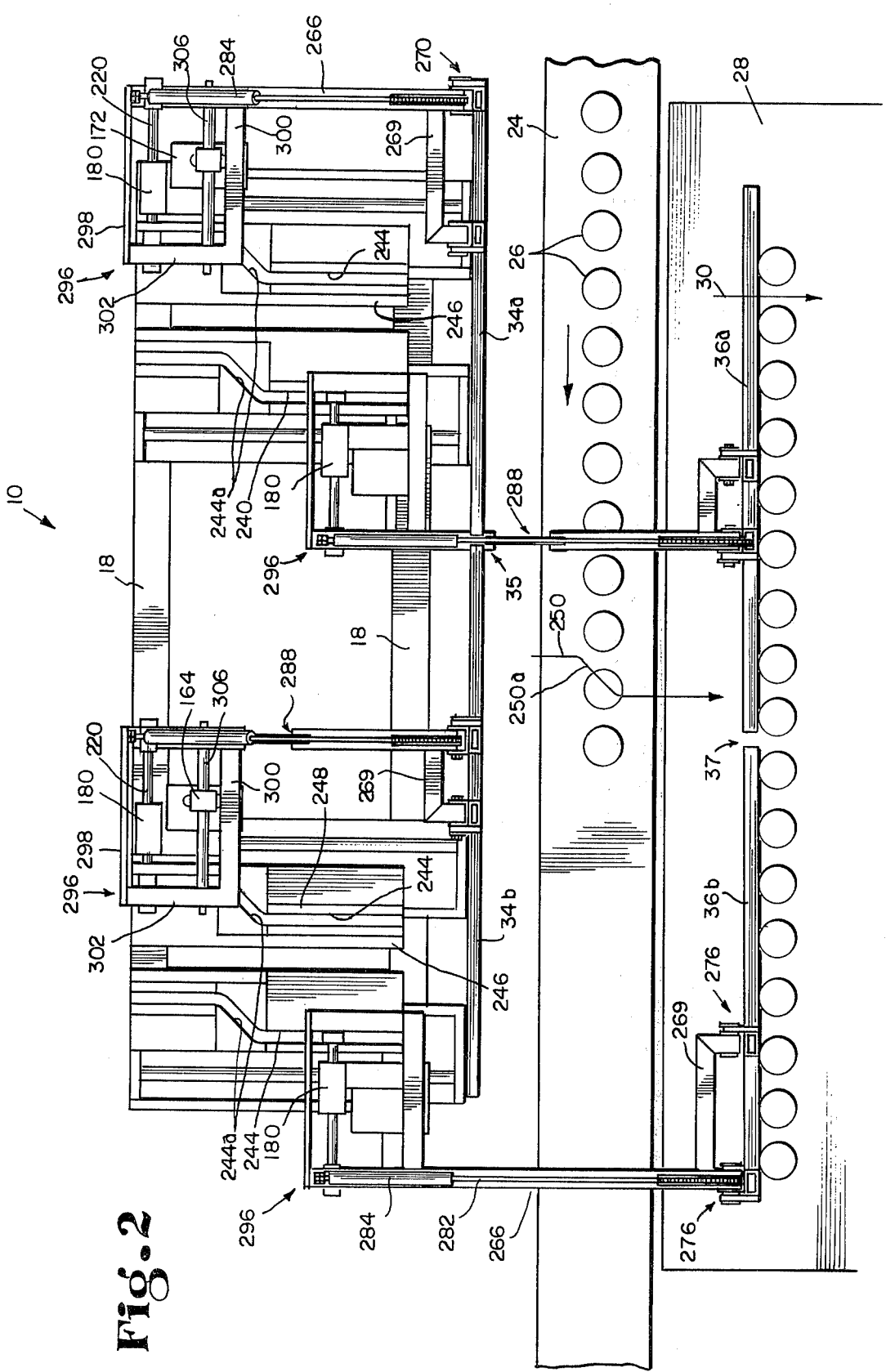
FIG. 2 is a top plan view showing the lehr loader in conjunction with a lehr apron and a feed conveyor and showing the pusher bar support means reversed from their positions shown in FIG. 1.
Figure 4:
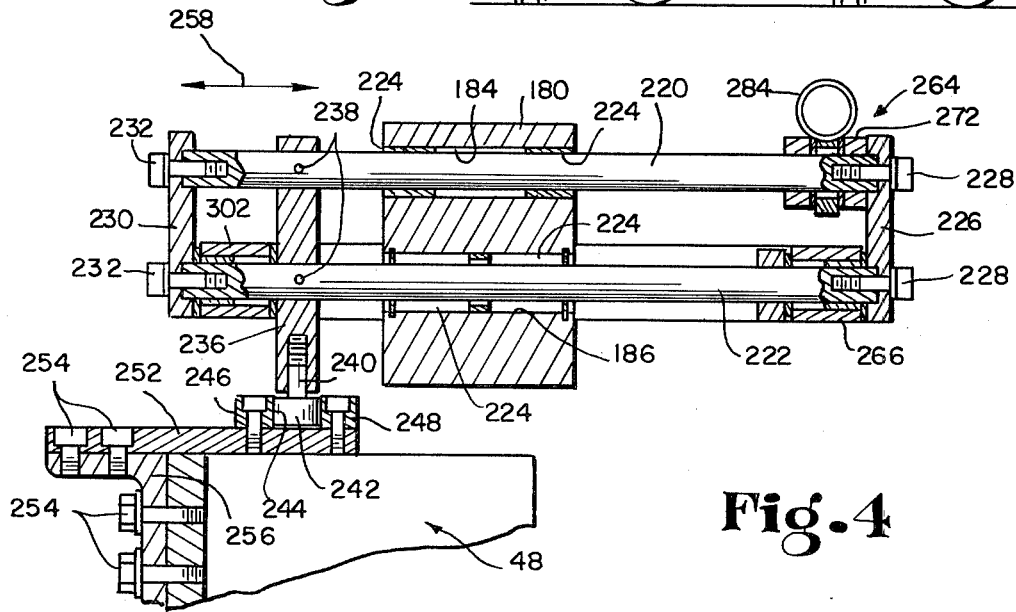
FIG. 4 is a fragmentary sectional view, enlarged, showing the cam means for shifting the push bars as they move transversely across the feed conveyor.

Referring now specifically to FIG. 4, it will be seen that cylindrical rods 220, 222 extend respectively through the openings 184, 186 in the block 180 on each carriage 50 with bearings 224 supporting the rods 220, 222 for longitudinal reciprocation in the block 180. Rods 220, 222 are horizontal and parallel to the bars 34, 36 and the sprocket shafts 84, 86. An end plate 226 is connected to the right-hand ends (FIG. 4) of the rods 220, 222 by fastening elements 228 while another end plate 230 is connected to the left-hand ends of fastening elements 232. A connector member 236 is fastened to the two rods 220, 222 by means such as the illustrated pins 238 to extend downwardly therefrom. A bolt 240 supports a roller bearing 242 on the lower end of the connector member 236 for rotation about a vertically extending axis, the bearing 242 being received in a cam track 244 which extends in the direction of movement of the bars 34, 36 except for a short segment 244a (FIG. 2) which inclines toward the conveyor 24 and in the direction of the movement of the conveyor. Each cam track 244 is illustratively defined by track members 246, 248 between which the bearing 242 moves. The arrow 250 in FIG. 2 represents the movement of the bars 34, 36 with the short arrow segment 250a representing the movement caused by the cam track section 244a. The members 246, 248 (FIG. 4) may be mounted upon a cam plate 252 which is fastened to the associated drive assembly 48 by means such as the illustrated fastening elements 254 and angle plate 256. The rods 220, 222, therefore, are shiftable on the carriage 50 (block 180) in the direction of the arrow 258 by cam means.

Each carriage 50 carries arm means indicated generally at 264 for movably supporting the bar section 34a, 34b, 36a, 36b mounted upon the carriage, the illustrative arm means including a first arm 266 mounted on the carriage 50 for pivotal movement at its proximal end about a horizontal axis parallel to the bars 34, 36. Illustratively, the first arm 66 is mounted upon the lower rod 22 for pivotal movement as best seen in FIG. 4. A second arm 268 is mounted upon the distal end of the first arm 266 for pivotal movement about a horizontal axis parallel to the bars 34, 36, the second arm pivot means being indicated at 270. The arm 268 extends vertically downwardly to provide a lower end to which its associated bar section 34a, 34b, 36a, 36b is connected. An arm 272 is parallel with each first arm 266 and pivotally connected to the upper rod 220 for pivotal movement (FIG. 4) with the first arm. A short, vertically extending link 274 has its opposite ends pivotally connected, respectively, to the distal ends of the first arm 266 and the arm 272 by pivot means 270 and another pivot means 276. This link 274 remains vertically extending because the end plates 226, 230 between the guide rods 220, 222 remain vertically extending. The upper end of the second arm 268 is yieldably held against the pivot means 276 by means such as the illustrated chain 280, and rod 282 which extends from a spring tube 284 mounted on the arm 272 by means indicated at 286. This spring arrangement, which is preferably adjustable, provides yieldable means for holding the second arm 268 in its vertically downwardly extending position. If the arm 268 or the bar section held thereby encounters a rigid object, the spring within the tube 284 will yield to permit the second arm 268 to pivot counterclockwise about the distal end of the first arm 266. As best seen in FIGS. 1, 2 and 3, two of the first arms 266, are separated into two longitudinal arm sections 266a, 266b with a laterally thin splice section 288 therebetween. This laterally thin splice section 288 is the portion which moves through the spaces 35, 37 between the bar sections 34a, 34b, 36a, 36b. By having this laterally thin splice section 288, the spaces 35, 37 can be relatively longitudinally narrow.

Further, for strength purposes, as best seen in FIGS. 1 and 2, a pair of vertically downwardly extending second arms 268, 268a may be pivotally connected to the distal ends of the first arms with the lateral extension between the two second arms being indicated at 269. Further, for strength purposes, the proximal end portion of each first arm 266 may be formed to include a rectangular frame 296 movable with the arm, the frame including a back member 298, front member 300 and side member 302 with the arm section 266a forming the other side member. This frame, therefore, pivots about the lower rod 222 (FIG. 4) with the arm. Spaced forwardly from the pivot axis of the rod 222 is a cylindrical rod 306 parallel to the pivot axis and rigidly supported by the frame 296. This rod 306 extends through the upper connector 164 of the associated rigid link 140 and, of course, slides through the bearing 170 in that connector to permit the arm 266 to be shifted by the cam track 244 relative to the carriage 50 upon which the arm is mounted.

With the above description in mind, it will be appreciated that operation of the motor 190 and gear box 192 drives each chain 78 about its sprocket 80, 82. Each drive assembly 48, therefore, reciprocates its associated carriage 50 backward and forward upon its guide rods 52, 54 while, at the same time, raising and lowering the rigid link means 140, the upper end of which is connected to the arm means 264 mounted upon the carriage 50. As the block 66 starts to travel upwardly about the sprocket 80, the connector 142 will be cranked upwardly as indicated by the arrow 312 in FIG. 3 to raise the rigid link means 140. As the block 60 moves about each sprocket 80, 82, the axis of its shaft 62 stays coincident with the rotational axis of the sprocket. The axis of that shaft 62, therefore, moves in a horizontal plane defined by the parallel axes of the sprockets 80, 82. As the block 60 moves rearwardly toward the sprocket 82, on the upper run of the chain 78, the rigid link means 140 is held in its upper position. Then, as the block 60 starts moving downwardly about the sprocket 82, the connector 142 moves downwardly as indicated by the arrow 314 in FIG. 3. Each drive assembly 48, therefore, reciprocates its associated carriage 50 and raises and lowers the arm means 264 and specifically the first arm 266 pivotally mounted on the carriage.

The drive assemblies 48 for the bar sections 36a and 36b are 180° out of phase with the drive assemblies for the bar sections 34a and 34b. This is best seen in FIG. 3 where bar 36 is shown at the end of its forward stroke ready to move upwardly while the bar 34 is at the end of its rearward stroke ready to move downwardly.

I claim:

1. A stacker-pusher comprising frame means, a pair of parallel bars extending longitudinally and horizontally along said frame means, said bars having the same general length, said bars being movable alternately through the same general path including a transverse horizontal stroke perpendicular to the direction of extension of said bars, and said bars remaining parallel to each other as they move through said path, in which the improvement comprises means for mounting said bar for such movement and means for driving said bars, said mounting means including, for each said bar, a carriage reciprocably movable in the direction of said transverse horizontal stroke, a first arm mounted on said carriage for pivotal movement at its proximal end about a horizontal axis parallel to said bars, a second arm mounted on the distal end of said first arm for pivotal movement about a horizontal axis parallel to the last said axis, said second arm extending downwardly to provide a lower end to which said bar is attached, and said drive means including, for each said bar, a pair of rotor means journal mounted for rotation about horizontally extending axes parallel to said bars and spaced apart in the direction of said stroke, endless means trained about said rotor means, means for providing a driving connection between said endless means and said carriage associated with said bar and between said endless means and said first arm pivoted on said carriage, whereby movement of said endless means about said rotor means reciprocates said carriage and raises and lowers said first arm, and said drive means being synchronized such that said bars alternately move through said path at the same frequency and speed.

2. The improvement of claim 1 in which each bar is provided by a pair of longitudinally extending bar sections longitudinally spaced apart to provide a space therebetween through which a portion of said first arm for said other bar passes as said bars move through said path.

3. The improvement of claim 1 in which said mounting means includes, for each said bar, means for mounting said proximal end of said first arm on said carriage for shifting movement in a direction parallel to said pivot axis at said proximal end of said first arm, and cam means for shifting said first arm and said bar in the direction of extension of said bar as said carriage reciprocates through a portion of its travel.

4. The improvement of claim 3 in which each bar is provided by a pair of longitudinally extending bar sections longitudinally spaced apart to provide a space therebetween through which a portion of said first arm for said other bar passes as said bars move through said path.

5. For use with a conveyor for moving articles to a station adjacent the conveyor, a stacker comprising a pair of pusher bars disposed to extend alongside the conveyor and opposite the station, said bars being movable transversely across the conveyor to engage and move such articles from the conveyor onto the station, frame means upon which said bars are mounted, and drive means for said bars, in which the improvement comprises means for mounting said bars upon said frame means for such movement and means for driving said bars, said bars being of the same general length in the direction of said conveyor, said mounting means providing for movement of said bars through the same general path including, sequentially, a forward stroke toward the station to engage and move such articles, an upward stroke to provide clearance for the forward stroke of said other bar, a rearward stroke, and a downward stroke to the starting position for said forward stroke, said mounting means including, for each bar, a pair of arm means supporting said bar at longitudinally spaced apart points, and each said bar being provided by a pair of longitudinally extending bar sections supported, respectively, by said arm means associated therewith and providing a longitudinal space therebetween through which one of said arm means supporting said other bar moves as said bars are moved through said path, said drive means moving said arm means to move said bars through said path, said drive means and mounting means being cooperatively synchronously connected such that one of said bars is starting its downward stroke when the other of said bars is starting its upward stroke.

6. The improvement of claim 5 in which said mounting means includes, for each said bar, a pair of carriages reciprocably movable in the direction of said forward stroke and carrying, respectively, said pair of arm means supporting said bar, said arm means being mounted, respectively, on said carriages for pivotal movement about an axis parallel to said bar, and said drive means including, for each said bar, a pair of rotor means journal mounted for rotation about horizontally extending axes parallel to said bars and spaced apart in the direction of said forward stroke, endless means trained about said rotor means, means for providing a driving connection between said endless means and said carriage associated with said bar and between said endless means and said arm means mounted on said carriage, whereby movement of said endless means about said rotor means reciprocates said carriage and raises and lowers said arm means mounted thereon.

7. The improvement of claim 5 in which said mounting means includes, for each said bar, a pair of carriages reciprocably movable in the direction of said forward stroke and carrying, respectively, said pair of arm means supporting said bar, each said arm means including a first arm mounted on said carriage for pivotal movement at its proximal end about an axis parallel to said bar, a second arm mounted on the distal end of said first arm for pivotal movement about an axis parallel to said bar, said second arm extending downwardly to provide a lower end to which said bar is attached, and said drive means including, for each said bar, means for reciprocating said carriage for said bar and raising and lowering said first arm mounted on said carriage.

8. The improvement of claim 5 in which said mounting means includes, for each said bar, carriage means supporting said arm means for reciprocation in the direction of said forward stroke, said arm means being movable upwardly and downwardly on said carriage means, and said drive means including means for reciprocating said carriage means and raising and lowering said arm means.

9. The improvement of claim 6 in which said endless means includes a chain and said rotor means includes sprockets about which said chain is trained, said means providing a driving connection including link means connected to said arm means, and crank means for raising and lowering said link means, said crank means being connected to said chain to raise and lower said link means as said crank means moves about said sprockets.

10. The improvement of claim 9 in which said crank means includes a shaft journalled in said carriage to reciprocate said carriage, means for eccentrically connecting one end of said link means to said shaft, said sprockets having parallel journal axes defining a plane therebetween, and said shaft defining a journal axis remaining in said plane.

11. In a lehr loader for use with a conveyor for moving ware serially past the moving apron of a lehr, said loader comprising frame means adapted to be adjacent said conveyor, and a pair of pusher bars alongside the conveyor and opposite the lehr apron, said bars being alternately movable transversely across the conveyor to sweep ranks of ware transversely from the conveyor onto the lehr apron for movement thereon through the lehr, in which the improvement comprises means for mounting said bars upon said frame means for such movement and drive means for moving said bars, said mounting means providing for movement of said bars through the same general path, each said bar being provided by a pair of longitudinally extending bar sections, longitudinally aligned with one another providing a longitudinal space therebetween, said mounting means including, for each said bar, a pair of arm means supporting, respectively, said bar sections, one of said arm means for each said bar being movable through said space between said bar sections of the other said bar as said bars move through said path.

12. The improvement of claim 11 in which said mounting means includes carriage means supporting each said arm means for reciprocation toward and away from the apron of said lehr, said arm means being mounted on said carriage means for movement upwardly and downwardly, and said drive means including means for reciprocating said carriage means and raising and lowering said arm means thereon.

13. The improvement of claim 12 in which said drive means includes a pair of rotor means journal mounted for rotation about parallel axes spaced apart in the direction of reciprocation of said carriage means, flexible means trained about said rotor means, and means for providing a driving connection between said flexible means and said carriage means and between said flexible means and said arm means.

14. The improvement of claim 12 in which each said arm means includes a first arm mounted on its said carriage means for pivotal movement at its proximal end about an axis parallel to said bars, a second arm mounted on the distal end of said first arm for pivotal movement about an axis parallel to said bars, said second arm extending downwardly to provide a lower end to which its said bar section is attached.

15. The improvement of claim 14 including means for normally keeping said second arm extending vertically downwardly.

16. The improvement of claim 15 including means for yieldably resisting movement of said second arm from its vertically extending position.

17. The improvement of claim 13 in which said means providing a driving connection includes rigid link means connected to said arm means, and crank means for raising and lowering said link means, said crank means being connected to said flexible means to move therewith and to raise and lower said link means as said crank means moves about said rotor means.

18. The improvement of claim 17 in which said crank means includes a shaft journalled in said carriage means to reciprocate said carriage means, means for eccentrically connecting one end of said link means to said shaft, the axes of said rotor means defining a plane extending therebetween, and said shaft having a journal axis remaining in said plane.

19. The improvement of claim 12 in which said mounting means includes means for mounting each said arm means on its said carriage means for shifting movement in a direction parallel to the direction of the movement of the ware on the conveyor, and cam means for shifting said arm means and the said bar thereon in the direction of said conveyor as said bar moves transversely across the conveyor.

* * * * *